2,786,080
Patented Mar. 19, 1957

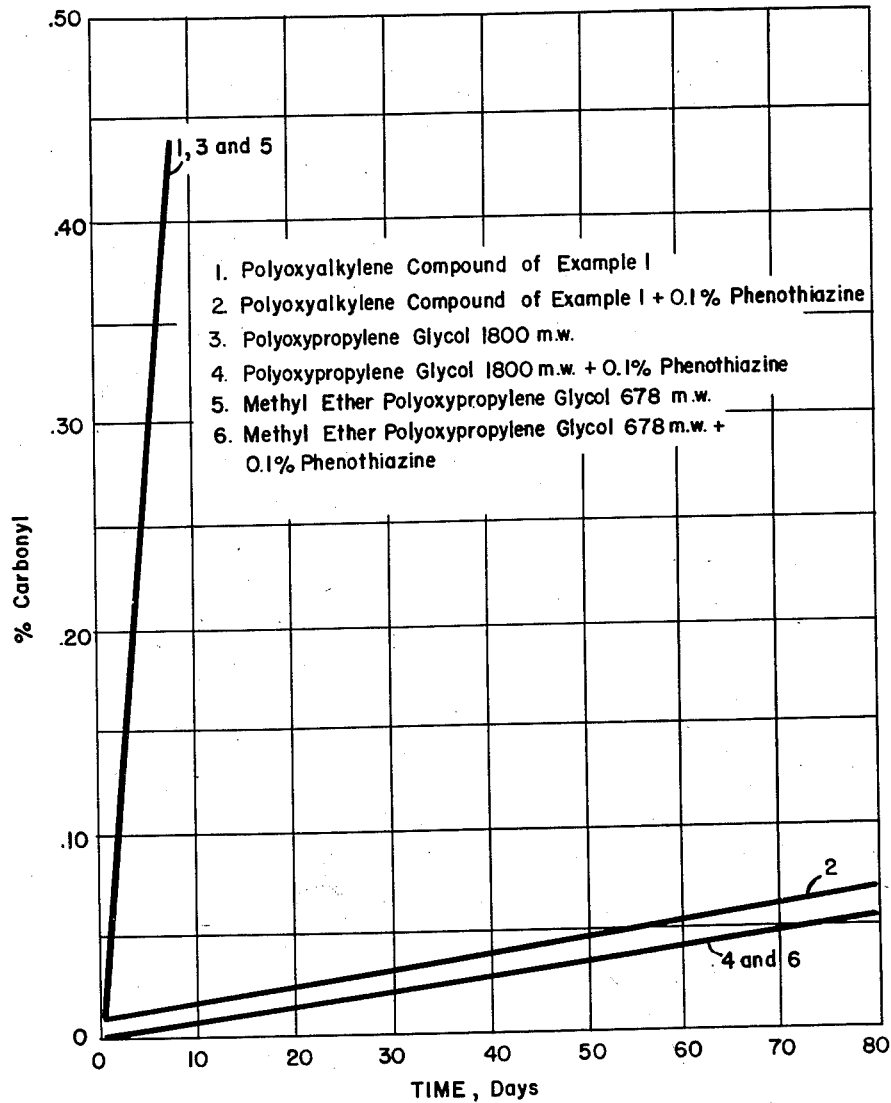

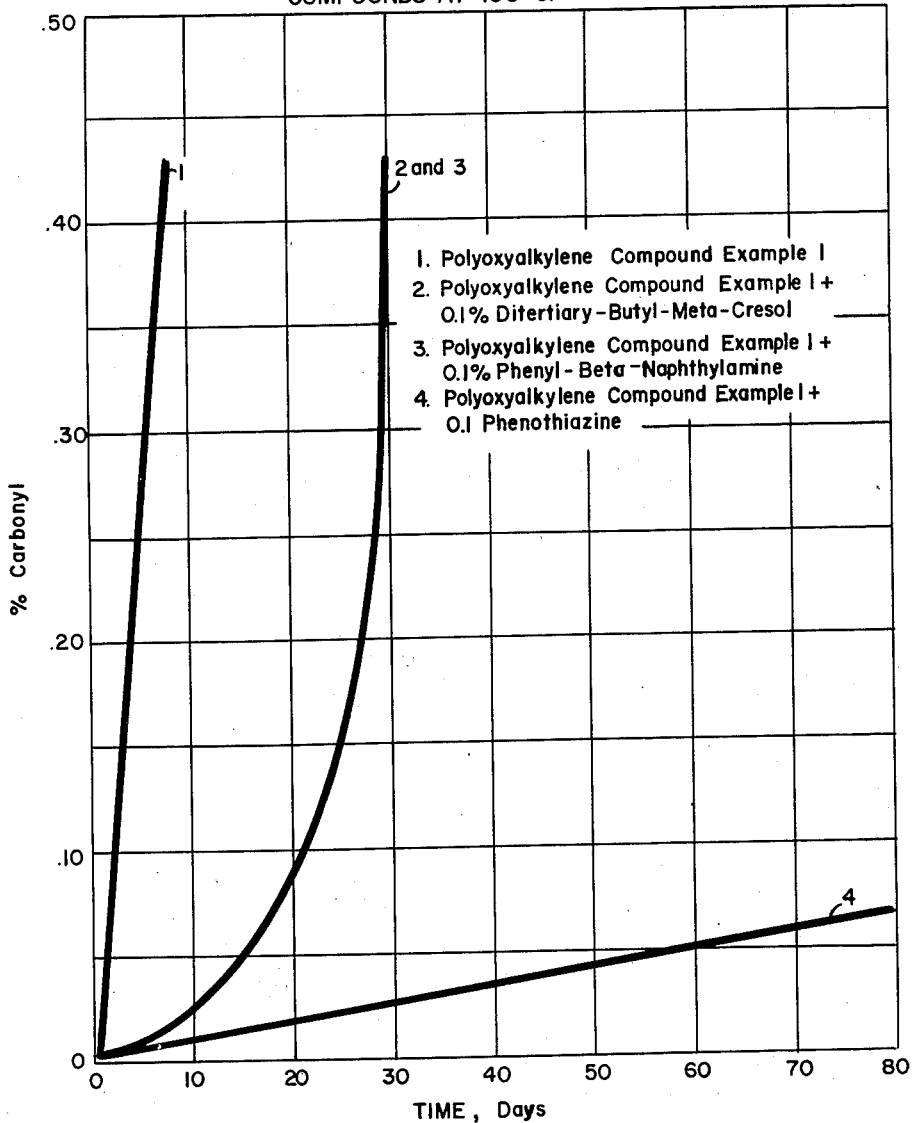

2,786,080

STABILIZED POLYOXYALKYLENE COMPOSITIONS

John T. Patton, Jr., Wyandotte, Mich., assignor to Wyandotte Chemicals Corporation, Wyandotte, Mich., a corporation of Michigan Application November 25, 1953, Serial No. 394,319

13 Claims. (Cl. 260—611.5)

This invention relates to polyoxyalkylene compounds that are stabilized against oxidation and its deleterious effects. More specifically, the present invention relates to polyoxyalkylene compounds having incorporated therein a small quantity of phenothiazine as a stabilizer.

Polyoxyalkylene compounds are a valuable and well known class of organic compounds that are used as synthetic lubricants, hydraulic fluids, detergents, plasticizers and in other diverse applications. A serious shortcoming of the polyoxyalkylene compounds is that they are highly susceptible to oxidation, particularly at elevated temperatures. Oxidation of these compounds produces strongly odoriferous products which are objectionable in many compositions, e. g. cosmetics. Such oxidation attack is particularly objectionable when the polyoxyalkylene compounds are employed as lubricants, since the resulting oxidation products are highly corrosive in nature, and adversely change the viscosity characteristics of the lubricant. In some cases this tendency towards oxidation is so marked that high lubricant consumption is encountered.

It has been previously suggested in the prior art that polyoxyalkylene compounds can be stabilized against oxidation by the incorporation therein of 0.5–5% of oxidation inhibitors, such as aromatic amines and phenolic compounds. While these prior art stabilizers are of some value, they are not sufficiently effective to satisfy the needs of the art. Stabilizers now in use are objectionable in that relatively large quantities (usually 1–2.5%) are required for efficient stabilization, and, on ageing, polyoxyalkylene compounds containing these stabilizers become highly colored.

It is an object of this invention to provide polyoxyalkylene compounds which are effectively stabilized against oxidation.

Another object of this invention is to provide stabilized polyoxyalkylene compounds containing only minor amounts of a stabilizing compound.

Other objects and advantages of this invention will become apparent from the following detailed description thereof, when read in conjunction with the accompanying drawings, in which Fig. 1 is a graph showing the rate of oxidation of polyoxyalkylene compounds containing stabilizers of the type defined herein, and Fig. 2 is a graph showing the rate of oxidation of polyoxyalkylene compounds containing stabilizers of the type described herein as compared with the rate of oxidation of the same polyoxyalkylene compounds containing stabilizers of the type disclosed in the prior art.

It has been discovered that polyoxyalkylene compounds are effectively stabilized against the deleterious effects of oxidation by incorporating therein small quantities of phenothiazine, or carbocyclic alkyl-substituted derivatives thereof.

The polyoxyalkylene compounds with which the present invention is concerned are characterized by having recurring oxyalkylene groups of the following type in their structure:

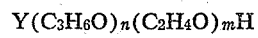

wherein: $R_1$, $R_2$, $R_3$ and $R_4$ are hydrogen or hydrocarbon radicals. Of particular concern are those polyoxyalkylene compounds having molecular weights in excess of 250 and which may be utilized as hydraulic fluids, synthetic lubricants, detergents, etc.

The term polyoxyalkylene compound is used to designate those compounds which are obtained by condensing a plural number of alkylene oxide molecules with an organic compound containing one or a plurality of reactive hydrogen atoms. Typical of such compounds are: polyoxyalkylene glycols, e. g. polyoxyethylene glycol, polyoxypropylene glycol, the "heteric" or mixed oxyethylene-oxypropylene polyglycols of U. S. 2,425,845, etc., the monoethers obtained by condensing an alkylene oxide with a monohydric alcohol or phenol and the monoesters obtained by condensing an alkylene oxide with a monobasic carboxylic acid. Another class of compounds included within the scope of the term are the conjugated sequential condensation products of propylene and ethylene oxide with reactive hydrogen compounds containing a single reactive hydrogen atom. These compounds have the following formula:

$$Y(C_3H_6O)_n(C_2H_4O)_mH$$

wherein:

Y is the residue of an organic compound containing one reactive hydrogen compound,
$n$ has an average value of at least 6.4, as determined by hydroxyl number, and
$m$ has a value such that the oxyethylene groups constitute 25–90%, by weight, of the compound.

The structure and preparation of the above compounds are described in detail in the copending application of Donald R. Jackson and Lester G. Lundsted, Serial No. 229,128, filed May 31, 1951, now U. S. 2,677,700 and that description is incorporated herein by reference.

A further class of polyoxyalkylene compounds included within the scope of the appended claims are the conjugated sequential condensation products of propylene and ethylene oxide with an organic compound containing a plurality of reactive hydrogen atoms. These compounds have the following formula:

Polyoxypropylene polymer $[(C_2H_4O)_nH]_x$ wherein:

The polyoxypropylene polymer is the condensation product of propylene oxide and an organic compound containing a plurality of reactive hydrogen atoms and has a molecular weight of at least 900, as determined by hydroxyl number,
$n$ is an integer,
$x$ is an integer not larger than the number of reactive hydrogen atoms present in the organic compound from which the polyoxypropylene polymer is derived, and
$n$ and $x$ have values such that the oxyethylene content constitutes 20–90%, by weight, of the compound.

The preparation and structure of the above compounds are described in detail in the copending application of Lester G. Lundsted, Serial No. 386,945, filed October 19, 1953 now U. S. 2,674,619 and that description is incorporated herein by references. A related and preferred class of compounds are those conforming to the above formula in which the polyoxypropylene polymer is prepared by condensing propylene oxide with an aliphatic diamine or polymer thereof, e. g. ethylene diamine. These compounds are likewise disclosed in the copending application of Lester G. Lundsted, just referred to, which is now U. S. Patent No. 2,674,619.

The following examples will more clearly illustrate the principle and practice of the present invention to those skilled in the art:

EXAMPLE 1

A conjugated polyoxypropylene-polyoxyethylene compound was prepared as follows; (1) a polyoxypropylene glycol of 1800 molecular weight was prepared by condensing 1,2 propylene oxide with propylene glycol and (2) one part of the so-prepared polyoxypropylene glycol was condensed with four parts of ethylene oxide. Two samples of the conjugated polyoxypropylene-polyoxyethylene compound were prepared and to one of these was added 0.1% phenothiazine. These samples were then put in open beakers and placed in an air-circulating oven at 100° C. At the end of 2 and 7 days aliquots of the two samples were withdrawn and analyzed. The unstabilized compound developed an unpleasant odor and exhibited a strong infrared absorption band at 5.7 microns, thus indicating the presence of carbonyl groups. In contrast to these results, the phenothiazine stabilized sample was odor free and did not have an absorption band of 5.7 microns. These data demonstrate that phenothiazine inhibits the oxidation of polyoxyalkylene compounds, and that the infrared absorption at 5.7 microns is a quantitative measurement of the degree of oxidation that has taken place.

EXAMPLE 2

The stabilizing action of phenothiazine on the conjugated polyoxypropylene-polyoxyethylene compound set forth in Example 1, a polyoxypropylene glycol having a molecular weight of 1800 and a monomethyl ether of a polyoxypropylene glycol having a molecular weight of 678, was determined. One-tenth percent phenothiazine was added to each of the above described polyoxyalkylene compounds and the samples were placed in open beakers in an air circulating oven at 100°. Periodically aliquots of the samples were withdrawn and the infrared absorption thereof at 5.7 microns was determined in 20% carbon tetrachloride solutions. These data, together with those obtained with the unstabilized polyoxyalkylene compounds, are set forth in Table I, below and are plotted in Fig. 1:

Table I

| Sample | Percent Carbonyl After, days [a] | | | | | | | |
|---|---|---|---|---|---|---|---|---|
| | 0 | 1 | 2 | 3 | 7 | 20 | 44 | 79 |
| Polyoxyalkylene Compound of Example 1 | 0.013 | 0.06 | | | [b] 0.43 | | | |
| Polyoxyalkylene Compound of Example 1 + 0.1% phenothiazine | 0.013 | | | 0.015 | 0.028 | 0.037 | 0.049 | 0.069 |
| Polyoxypropylene Glycol | 0.015 | | 0.082 | | [b] 0.43 | | | |
| Polyoxypropylene Glycol + 0.1% phenothiazine | 0.015 | | 0.015 | | 0.017 | 0.028 | 0.032 | 0.052 |
| Methyl Ether Polyoxypropylene Glycol | 0.000 | | 0.062 | | 0.43 | | | |
| Methyl Ether Polyoxypropylene Glycol + 0.1% phenothiazine | 0.000 | | 0.000 | | 0.006 | 0.017 | 0.024 | 0.052 |

[a] Percent carbonyl determined from calibration curve using amyl acetate as source of carbonyl group.
[b] Concentration above 0.43, which is upper limit of calibration curve.

Referring to Fig. 1, it will be seen that phenothiazine has a remarkable stabilizing action on each of the three different polyoxyalkylene compounds. It will be noted that each of the unstabilized compounds was oxidized to a greater extent in two days than was the corresponding stabilized compound after 79 days.

EXAMPLE 3

To illustrate the superior stabilizing action of phenothiazine, as compared with stabilizers shown in the prior art, 0.1% phenothiazine, 0.1% phenyl beta-naphthylamine and 0.1% 2,6 ditertiary-butyl-meta-cresol were incorporated into the conjugated polyoxypropylene-polyoxyethylene compound described in Example 1. The samples were aged at 100° C. as set forth in Example 2. Data showing the development of carbonyl content with time are set forth in Table II below and are plotted in Fig. 2:

Table II

| Sample | Percent Carbonyl After, days [a] | | | | | | | |
|---|---|---|---|---|---|---|---|---|
| | 0 | 4 | 7 | 15 | 20 | 22 | 29 | 44 | 79 |
| Polyoxyalkylene Compound of Example 1 | 0.022 | 0.34 | [e] 0.43 | | | | | | |
| Polyoxyalkylene Compound of Example + DTBMC [b] | 0.022 | 0.045 | 0.045 | 0.079 | | | 0.43 | | |
| Polyoxyalkylene Compound of Example + PBNA [c] | 0.022 | 0.037 | 0.041 | 0.058 | | 0.267 | [e] 0.43 | | |
| Polyoxyalkylene Compound of Example + P. T. [d] | 0.022 | | | | 0.037 | | | 0.049 | 0.069 |

[a] Percent carbonyl determined from calibration curve using amyl acetate as source of carbonyl group.
[b] Ditertiary butyl-m-cresol.
[c] Phenyl B-naphthylamine.
[d] Phenothiazine.
[e] Concentration above 0.43, which is upper limit of calibration curve.

Referring to Fig. 2, it will be noted that, after any finite period of time, the polyoxyalkylene compound containing phenothiazine had undergone less oxidation than the same compound inhibited with either of the prior art stabilizers. It will also be noted that after a period of about 20 days both of the prior art stabilizing compounds lost their efficiency and thereafter the polyoxyalkylene compound was oxidized as rapidly (as measured by the slope of the curve) as the uninhibited compound.

EXAMPLE 4

A conjugated polyoxypropylene-polyoxyethylene compound was prepared as follows; (1) a polyoxypropylene polymer having a calculated molecular weight of 3,000 was prepared by condensing propylene oxide with ethylenediamine and (2) 37.5 parts of the so-prepared polyoxypropylene polymer was condensed with 62.5 parts of ethylene oxide. Two samples of the above compound were prepared and to one was added 0.05% phenothiazine. The samples were placed in open beakers in an air-circulating oven at 100° C. and samples were periodically withdrawn for analysis by the method described in Example 2. The results are set forth in Table III below:

pending application, Serial No. 257,499, filed November 21, 1951, now abandoned.

In the appended claims, the term "cogeneric mixture"

Table III

| Sample | Percent Carbonyl after, days * | | | | | | | | |
|---|---|---|---|---|---|---|---|---|---|
|  | 6 | 7 | 8 | 9 | 10 | 13 | 15 | 24 | 29 | 34 |
| Polyoxyalkylene Compound | 0.18 | 0.28 | 0.3 |  |  |  |  |  |  |  |
| Polyoxyalkylene Compound+0.05% phenothiazine |  | 0.011 | 0.015 | 0.019 | 0.026 | 0.026 | 0.028 | 0.144 | 0.29 | 0.30 |

* Percent carbonyl determined from calibration curve using amyl acetate as source of carbonyl group.

From an inspection of the above table it is apparent that the phenothiazine effectively stabilized the polyoxyalkylene compound. In contrast to these results, typical prior art stabilizers such as ditertiarybutyl-m-cresol have virtually no stabilizing action on this particular polyoxyalkylene compound.

The reasons for the stabilizing action of phenothiazine are unknown, however, the stabilizing mechanism appears to be radically different from that of conventional stabilizers. The majority of conventional stabilizers, and including those disclosed in the prior art, operate through a preferential oxidation mechanism, i. e. the stabilizer is more easily oxidized than the polyoxyalkylene compound and, when in the presence of oxidizing agents, is oxidized in preference to the polyoxyalkylene compound. In inhibiting the oxidation of polyoxyalkylene compounds such stabilizers are destroyed, and eventually, after all the stabilizer has been converted to its oxidized form, the polyoxyalkylene compound undergoes oxidation at the same rate as the unstabilized compound. This type of mechanism is clearly illustrated by the curves in Fig. 2 showing the compounds stabilized with ditertiary-butyl-meta-cresol and phenyl-beta-naphthylamine in which the rate of oxidation increased to the level of the uninhibited composition after about 20 days, when presumedly the stabilizers were converted to their oxidized or inactive form. From an inspection of Fig. 2, it is the logical conclusion that phenothiazine is not being oxidized under the test conditions and that the polyoxyalkylene compound in which it is incorporated will be stabilized against oxidation almost indefinitely.

While phenothiazine is highly efficient in stabilizing polyoxyalkylene compounds as a class, it is particularly efficacious in stabilizing polyoxyalkylene compounds having molecular weights in excess of 250 and containing oxypropylene groups or mixtures of oxypropylene and oxyethylene groups. Because of their viscosity-temperature relationships, such polyoxyalkylene compounds are eminently well suited for use as synthetic lubricants and/or hydraulic fluids. Phenothiazine is compatible with other standard additives customarily incorporated in polyoxyalkylene lubricants and hydraulic fluids, such as corrosion inhibitors, viscosity index improvers, pour point depressants, extreme pressure additives, etc.

It has been discovered that the structural group:

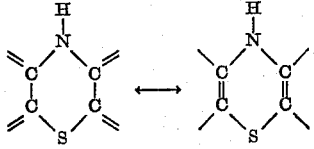

is responsible for the remarkable stabilizing action of phenothiazine. Therefore, while the herein described specific examples show polyoxyalkylene compounds containing phenothiazine as the stabilizing agent, carbocyclic substituted alkyl phenothiazines may be used in lieu thereof. Thus 1-methyl-phenothiazine, 2-isopropylphenothiazine, 1,9-diethylphenothiazine, 3-methyl-6-ethylphenothiazine, etc., may be used to stabilize polyoxyalkylene compounds.

This application is a continuation-in-part of my co-pending application, Serial No. 257,499, filed November 21, 1951, now abandoned.

In the appended claims, the term "cogeneric mixture" is used. This is a term that has been coined to designate a series of closely related, touching homologues that are obtained by condensing a plurality of alkylene oxide units with a reactive hydrogen compound (see U. S. Patent 2,549,438, particularly the section beginning at column 12, line 40).

What is claimed is:

1. A composition of matter comprising a polyoxyalkylene compound and a stabilizing quantity of a compound selected from the group consisting of phenothiazine and carbocyclic alkyl-substituted phenothiazines.

2. The composition of claim 1 wherein the polyoxyalkylene compound has a molecular weight of at least 250.

3. A composition of matter comprising a polyoxyalkylene compound and a stabilizing quantity of phenothiazine.

4. The composition of claim 3 wherein the polyoxyalkylene compound has a molecular weight of at least 250.

5. A composition of matter comprising a polyoxypropylene glycol having a molecular weight in excess of 250 and a stabilizing quantity of phenothiazine.

6. A composition of matter comprising an alkyl ether of a polyoxypropylene glycol having a molecular weight in excess of 250 and a stabilizing quantity of phenothiazine.

7. A composition of matter comprising a polyoxypropylene-polyoxyethylene compound having the formula:

$$HO-(C_2H_4O)_x(C_3H_6O)_y(C_2H_4O)_{x'}-H$$

where:

$y$ equals at least 15; and $(C_2H_4O)_{x+x'}$ equals 20–90% of the total weight of the compound and a stabilizing quantity of phenothiazine.

8. A composition of matter comprising a polyoxyalkylene compound having a molecular weight in excess of 250 and 0.05–5.0% phenothiazine.

9. A composition of matter comprising a polyoxypropylene glycol having a molecular weight in excess of 250 and 0.05–5.0% phenothiazine.

10. A composition of matter comprising an alkyl ether of a polyoxypropylene glycol having a molecular weight in excess of 250 and 0.05–5.0% phenothiazine.

11. A composition of matter comprising a polyoxyethylene-polyoxypropylene compound having the type formula:

$$HO-(C_2H_4O)_x(C_3H_6O)_y(C_2H_4O)_{x'}-H$$

where:

$y$ equals at least 15;

and $(C_2H_4O)_{x+x'}$ equals 20–90% of the total weight of the compound and 0.05–5.0% phenothiazine.

12. A composition of matter comprising (1) a cogeneric mixture of conjugated polyoxypropylene-polyoxyethylene compounds containing in their structure oxypropylene groups, oxyethylene groups and an organic radical derived from an organic compound containing a plurality of reactive hydrogen atoms; the compounds being characterized in that all of the oxypropylene groups are present in polyoxypropylene chains that are attached to the organic radical at the site of a reactive hydrogen atom thereby constituting a polyoxypropylene polymer; the oxyethylene groups being attached to the polyoxypropylene polymer in polyoxyethylene chains; the average molecular weight of the polyoxypropylene polymers in the mixture being at least 900, as determined by hydroxyl number, and the oxyethylene groups present constituting 20–90%, by weight, of the mixture and (2) a stabilizing quantity of phenothiazine.

13. A composition of matter comprising (1) a cogeneric mixture of conjugated polyoxypropylene-polyoxyethylene compounds containing in their structure oxypropylene groups, oxyethylene groups and an organic radical derived from ethylene diamine; the compounds being characterized in that all of the oxypropylene groups are present in polyoxypropylene chains that are attached to the organic radical at the site of a reactive hydrogen atom thereby constituting a polyoxypropylene polymer; the oxyethylene groups being attached to the polyoxypropylene polymer in polyoxyethylene chains; the average molecular weight of the polyoxypropylene polymers in the mixture being at least 900, as determined by hydroxyl number, and the oxyethylene groups present constituting 20–90%, by weight, of the mixture and (2) 0.05–5.0% phenothiazine.

References Cited in the file of this patent
UNITED STATES PATENTS

| | | |
|---|---|---|
| 1,970,578 | Schoeller et al. | Aug. 21, 1934 |
| 2,133,480 | Schoeller et al. | Oct. 18, 1938 |
| 2,174,761 | Schuette et al. | Oct. 3, 1939 |
| 2,520,733 | Morris et al. | Aug. 29, 1950 |
| 2,536,685 | Harman et al. | Jan. 2, 1951 |
| 2,576,094 | Barthel | Nov. 27, 1951 |
| 2,674,619 | Lundsted | Apr. 6, 1954 |

OTHER REFERENCES

Liander et al.: Chem. Abstracts, vol. 43 (1949), col. 385 (1 page).

Kern et al.: Chem. Abstracts, vol. 44 (1950), col. 2269 (1 page).

Murphy et al.: Chem. Abstracts, vol. 45 (1951), col. 2188–9 (2 pgs.).